US005748569A

United States Patent [19]
Teodorescu et al.

[11] Patent Number: 5,748,569
[45] Date of Patent: May 5, 1998

[54] APPARATUS AND METHOD FOR CLOCK ALIGNMENT AND SWITCHING

[75] Inventors: Ioan V. Teodorescu; Anthony Mazzurco, both of Plano, Tex.

[73] Assignee: DSC Telecom L.P., Plano, Tex.

[21] Appl. No.: 769,370

[22] Filed: Dec. 19, 1996

[51] Int. Cl.$^6$ ............................. G04F 8/00; H04L 7/00
[52] U.S. Cl. ........................ 368/118; 375/357; 375/371
[58] Field of Search ............................. 368/113–120; 375/226, 340, 356, 357, 371, 375; 327/261, 262

[56] References Cited

U.S. PATENT DOCUMENTS

| | | | |
|---|---|---|---|
| 4,737,952 | 4/1988 | Crookshanks | 370/545 |
| 5,442,315 | 8/1995 | Hutchins | 327/159 |
| 5,515,403 | 5/1996 | Sloan et al. | 375/271 |
| 5,610,953 | 3/1997 | Betts et al. | 375/373 |

*Primary Examiner*—Vit W. Miska
*Attorney, Agent, or Firm*—Baker & Botts, L.L.P.

[57] ABSTRACT

In a telecommunication system having multiple timing subsystems receiving and distributing redundant timing signals, there is provided a circuitry (8, 100) for aligning first and second redundant timing signals (10, 12, 110, 112) and switching therebetween. The circuitry includes first and second phase-locked loops (18, 20, 118, 120) for receiving first and second redundant timing signals (10, 12, 110, 112), respectively, and multiplying the frequency of first and second redundant timing signals (10, 12, 110, 112) by a factor of N. The circuitry further includes a selecting and switching circuitry (34, 134) for receiving the multiplied first and second redundant timing signals (22, 23, 122, 124) and designating one as ACTIVE and the other as INACTIVE, and providing the ACTIVE timing signal as an output timing reference signal (54, 154). The selecting and switching circuitry further operating to switch the ACTIVE and INACTIVE timing signal designations and output timing reference signal in response to detecting a fault or a clock switching command. The ACTIVE timing signal is provided to a phase integrator (40, 140), which integrates phase transients out of the ACTIVE timing signal to avoid jitter in the output timing reference (54, 154).

20 Claims, 1 Drawing Sheet

APPARATUS AND METHOD FOR CLOCK ALIGNMENT AND SWITCHING

TECHNICAL FIELD OF THE INVENTION

This invention relates in general to the field of timing circuitry. More particularly, the present invention relates to apparatus and method for clock alignment and switching.

BACKGROUND OF THE INVENTION

In synchronous circuit applications, the clock signal is of the utmost importance. In particular, telecommunication switching systems require dependable timing signals to operate properly and to transmit digital data signals error free. To avoid failures caused by errors such as loss of clock and loss of frame, and to facilitate system fault diagnosis and testing, redundant timing signals may be provided. By using redundant timing signals, the system may operate with a backup timing signal upon detection of erroneous conditions in the active timing signal. Craft persons may also manually swap the timing signals in order to perform system diagnostics, maintenance and/or repairs. In telecommunication systems where high-speed data are transmitted, even single bit errors cannot be tolerated. It may be seen that in order to switch from one active clock signal to the other, the clock signals must be fully synchronous in frequency and phase to avoid producing bit errors in the data transmission.

In addition, it is sometimes desirable to operate the telecommunication system at low frequencies by transporting a low frequency system clock. This decision may be motivated by a need to avoid problems such as deflection and electro-magnetic interference (EMI) attenuation typically associated with high frequency operation; or by economic constraints prohibiting implementation of complex digital circuitry.

One approach to providing redundant timing signals is to provide manual reference clock switching. A disadvantage of this approach is that the manual switch is not dependent on observing a fault in the active timing signal, and thus may not be timely responsive in correcting such a fault. Another disadvantage of this method is that manual switching provides no phase alignment between the redundant reference signals. Without phase alignment, the reference signal is susceptible to wander and phase hit problems as known in the art.

Another approach is to implement digital delay lines to phase align the redundant reference signals. A disadvantage of this approach is that it requires a large amount of delay lines to phase-align the redundant signals. Large numbers of delay lines lead to problems of temperature sensitivity of the digital lines. This problem is particularly acute in low frequency operation, where the number of delay lines becomes extremely large. An additional problem associated with this approach is that it is difficult to control phase wander in digital circuits. While it is possible to remedy this problem by to having each reference clock monitor the other, this solution is problematic because the circuitry necessary to control the cross-monitoring is very complex and expensive. Additionally, this solution presents problems of false detection of faults between the clocks. Another solution to the problem of monitoring wander in the reference clocks is to monitor the two redundant reference clocks with a third clock. This solution, however, creates an additional expense of a third clock. Moreover, this solution places reliance on an unmonitored third clock, which has no guarantee of itself being accurate.

Still another approach is to use analog delay lines to align the phase of the redundant clocks. Although this solution avoids temperature sensitivity problems associated with digital delay lines, this solution is not realistic because the necessary analog lines are prohibitively expensive and take up too much space.

SUMMARY OF THE INVENTION

Accordingly, a need has arisen for a circuit to closely phase align and switch between two or more timing signals. Additionally, such a circuit must also compensate for the effects of varying temperature on circuit operations, and monitor the timing signals for error. In accordance with the present invention, apparatus and method for clock alignment and switching are provided which eliminate or substantially reduce the disadvantages associated with systems without such capabilities.

In one aspect of the invention, the circuitry for aligning first and second redundant timing signals and switching therebetween includes first and second phase-locked loops operable to receive first and second redundant timing signal, respectively, as input. First and second phase-locked loops being further operable to multiply the frequency of first and second redundant timing signals and to monitor the signals for a fault. The circuitry further includes a selecting and switching circuitry coupled to first and second phase-locked loops for designating one of the redundant timing signals as ACTIVE and the other as INACTIVE. A shifting circuitry is coupled to the selecting and switching circuitry to receive the ACTIVE timing signal and shift its phase to avoid jitter in the output timing signal.

The present invention provides technical advantages such as providing a system for aligning and switching redundant timing signals without the use of digital or analog delay lines. Avoiding the use of digital delay lines provides advantages of less complex circuitry, and avoiding problems of temperature sensitivity associated with digital delay lines. A further advantage of the present invention is facilitating system operation at low frequencies.

A still further advantage is providing a system to monitor the redundant reference signals for error without using one clock to monitor the other, and without the need for an additional reference clock. Yet another advantage is the provision of a system capable of automatically switching between reference clocks upon detecting a fault in the ACTIVE clock. Still another advantage is the provision of a system that facilitates manual clock switching while avoiding the problem of the output signal walking due to repeated switches of the ACTIVE clock. A further advantage of the present invention is providing a system capable of automatically aligning the phase of the redundant reference signals before a manual switch is performed.

BRIEF DESCRIPTION OF THE DRAWINGS

For a better understanding of the present invention, reference may be made to the accompanying drawings, in which.

DETAILED DESCRIPTION OF THE INVENTION

Figure 1:
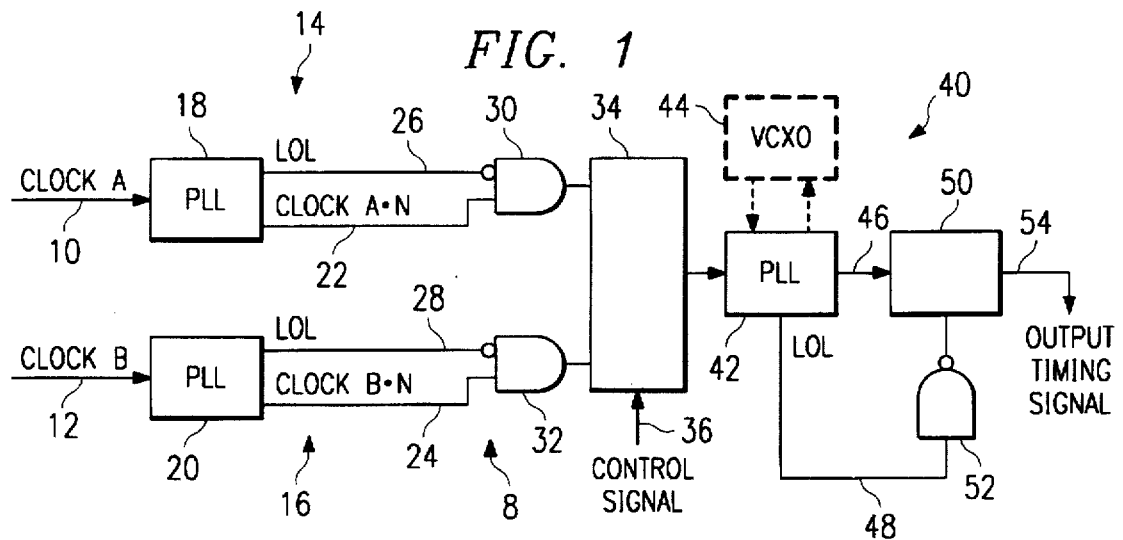
FIG. 1 is a simplified block diagram of one embodiment of the invention.
Figure 2:
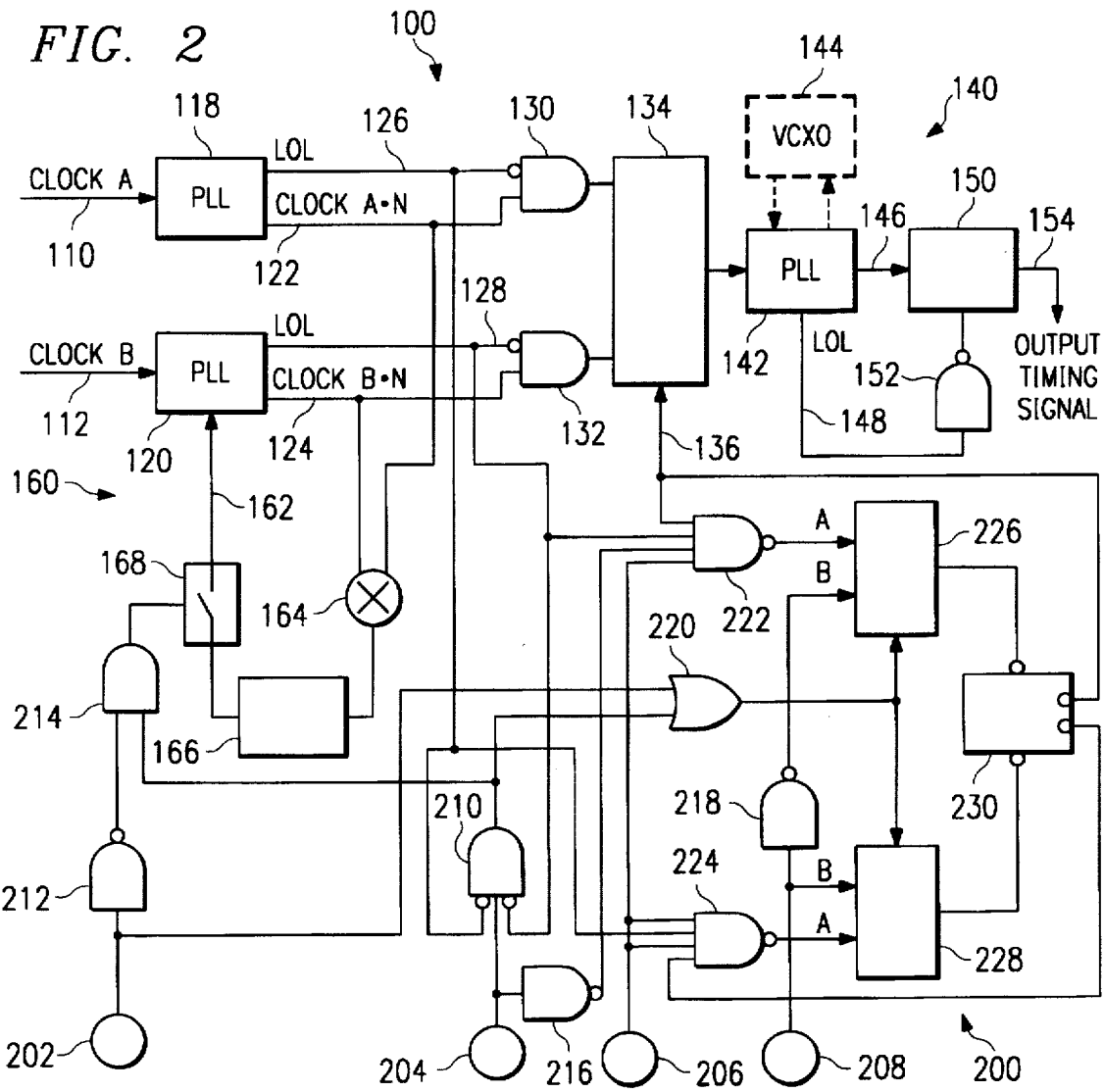
FIG. 2 is a simplified block diagram of another embodiment of the invention.

The preferred embodiment(s) of the present invention are illustrated in FIGS. 1 and 2, like reference numerals being used to refer to like and corresponding parts of the various drawings.

Referring to FIG. 1, a simplified block diagram of a reference clock switching and alignment system 8 is shown to illustrate a possible operating environment of the present invention. A first redundant timing signal (CLOCK A) 10 and a second redundant timing signal (CLOCK B) 12 are provided to timing subsystems 14 and 16, respectively. Timing signals 10 and 12 provide redundancy and the capability to switch between them when one is erroneous. In the telecommunications environment, system integrity and reliability provided by such redundancy is vital.

Timing subsystems 14 and 16 may include a first phase-locked loop (PLL) 18 and second phase-locked loop (PLL) 20, respectively. Although the present embodiment shows the use of two timing signals 10 and 12 and two phase-locked loops 18 and 20, it should be understood that any number of additional timing signal/phase-locked loop pairs could be included to provide additional redundancy.

Phase-locked loops 18 and 20 may operate to monitor timing signals 10 and 12 and to generate loss of lock signals (LOL) 26 and 28, respectively, in response to detecting a fault in the clock signal. Phase-locked loops 18 and 20 may further operate to multiply the frequency of timing signals 10 and 12 by a factor of N, where N is an integer greater than 1, generating multiplied redundant timing signals 22 and 24, respectively. Multiplying the frequency of redundant timing signals 22 and 24 provides an advantage of supporting low-frequency operation of system 8, while facilitating sufficient phase correction to avoid system error. The value of N depends on the requirements and capabilities of system 8. Increasing the value of N facilitates lower input clock frequency, but also requires the circuit components handling the multiplied timing signals to operate at the higher multiplied clock frequencies, leading to increased component expense. The value of N may be chosen to strike a compromise between low input clock frequency and realistic component costs. The factor N may be selected, for example, to be eight.

Timing subsystem 14 may further include an AND gate 30 which is coupled to first phase-locked loop 18, and is operable to receive multiplied redundant timing signal 22 and loss of lock signal 26. AND gate 30 operates to squelch multiplied redundant timing signal 22 upon receipt of loss of lock signal 26. Timing subsystem 16 may further include an AND gate 32 which is coupled to second phase-locked loop 20, and is operable to receive multiplied redundant timing signal 24 and loss of lock signal 28. AND gate 32 operates to squelch multiplied redundant timing signal 24 upon receipt of loss of lock signal 28.

Timing system 8 may also include a selecting and switching circuitry 34 which receives outputs from AND gates 30 and 32, as well as a control signal 36. Selecting and switching circuitry 34 operates to designate one of the multiplied redundant timing signals 26 and 28 as ACTIVE and the other as INACTIVE, depending on the content of control signal 36.

Control signal 36 may be any be any signal operable to initiate a switching event in selecting and switching circuitry 34 on the happening of given conditions. In a particular embodiment, control signal 36 may operate to cause a switching event in response to a general fault in the ACTIVE timing signal. The fault detected in the ACTIVE timing signal may be, for example, a lost clock, a drift in the ACTIVE clock, or a glitch in the ACTIVE clock. Specifically, control signal 36 may operate to cause a switching event in response to loss of lock signal 26 or 28.

In another embodiment, control signal 36 may operate to cause a switching event in response to a clock switching command, provided no fault is detected in timing signal 10 or timing signal 12. In still another embodiment, control signal 36 may operate to cause a switching event in response to a clock switching command, regardless of whether a fault has been detected in timing signals 10 or 12. Switching clocks manually with a clock switching command may be desirable to facilitate maintenance, diagnostics or repair of timing system 8.

Timing system 8 may further include a phase integrator 40, which receives the ACTIVE timing signal from selecting and switching circuitry 34. Phase integrator 40 may include a third phase-locked loop 42 operable to receive the ACTIVE timing signal and to integrate phase transients out of the ACTIVE timing signal as necessary upon a switching event. Shifting the phase of the ACTIVE timing signal results when a switching event has occurred and the presently ACTIVE clock signal is slightly out of phase with the previously ACTIVE clock signal. Third phase-locked loop 42 operates to gradually shift from the phase of the previous ACTIVE signal to that of the present ACTIVE signal. In this way, the timing signal of system 8 experiences only a phase wander, and avoids jitter in the system. An optional external crystal-controlled oscillator 44 may be coupled to third phase-locked loop 42 to provide a more effective phase integrating circuitry. Phase integrator 40 may operate to generate a phase-integrated timing signal 46 and a loss of lock signal 48. Loss of lock signal 48 operates to squelch the output timing signal 54 if a fault is detected in the timing signal designated as ACTIVE by selecting and switching circuitry 34.

A dividing circuitry 50 may receive phase-integrated timing signal 46 and loss of lock signal 48 from phase integrator 40. Dividing circuitry 50 operates to generate an output timing reference 54 by dividing the frequency of phase-integrated timing signal 46 by the factor N, so that the frequency of output timing reference 54 matches that of redundant timing signals 10 and 12. Dividing circuitry 50 may further operate to squelch output signal 54 upon receipt of loss of lock signal 48. Dividing circuitry 50 may be any circuitry capable of dividing the frequency of the ACTIVE timing signal by the factor N. A NAND gate 52 may be coupled between third phase-locked loop 42 and dividing circuitry 50. NAND gate 52 operates to invert loss of lock signal 48. In this way, loss of lock signal 48 may squelch output timing reference 54 by activating an active-low clear signal in dividing circuit 50.

In operation, timing system 8 receives first and second redundant timing signals 10 and 12. Phase-locked loops 18 and 20 multiply the frequencies of timing signals 10 and 12, respectively, by a factor of N generating multiplied timing signals 22 and 24. Additionally, phase-locked loops 18 and 20 monitor timing signals 10 and 12, respectively, for loss of lock. Loss of lock signals 22 and 24 may be used to provide a method of automatically disqualifying CLOCK A 10 or CLOCK B 12, to inhibit a manual switch to an erroneous clock, or to squelch output timing reference 54 in the event that both timing signals 10 and 12 are erroneous.

Selecting and switching circuitry 34 receives multiplied timing signals 22 and 24, and based on control signal 36, designates one signal as ACTIVE and the other as INACTIVE. Phase integrator 40 receives the ACTIVE timing signal and gradually corrects for any phase difference between the presently ACTIVE and previously ACTIVE signals. In addition, phase integrator 40 monitors the ACTIVE signal for loss of lock signal 48. Loss of lock signal 48 is used to squelch output signal 54 if the ACTIVE clock is erroneous. In the absence of loss of lock signal 48, dividing circuitry 50 divides the frequency of the ACTIVE timing signal by the factor N, generating output timing reference 54.

Referring to FIG. 2, a simplified block diagram of a reference clock switching and alignment system 100 is shown to illustrate another possible operating environment of the present invention. System 100 includes a first phase-locked loop 118 and a second phase-locked loop 120. Phase-locked loops 118 and 120 may receive a first redundant timing signal 110 and a second redundant timing signal 112, respectively. Phase-locked loops 118 and 120 are operable to multiply the frequency of timing signals 110 and 112 by a factor of N, where N is an integer greater than 1. Phase-locked loops 118 and 120 generate multiplied redundant timing signals 122 and 124, respectively. Phase-locked loops 118 and 120 may further operate to generate loss of lock signals 126 and 128, respectively, in response to faults detected in timing signals 122 and 124.

System 100 may further include an AND gate 130 which is coupled to first phase-locked loop 118. AND gate 30 may operate to receive multiplied redundant timing signal 122 and loss of lock signal 126. AND gate 130 may further operate to squelch multiplied redundant timing signal 122 upon receipt of loss of lock signal 126. System 100 may further include an AND gate 132, which is coupled to second phase-locked loop 120, and may operate to receive multiplied redundant timing signal 124 and loss of lock signal 128. AND gate 32 may further operate to squelch multiplied redundant timing signal 124 upon receipt of loss of lock signal 128.

System 100 may include a selecting and switching circuitry 134 which receives outputs from AND gates 130 and 132, as well as a control signal 136. Selecting and switching circuitry 134 operates to designate one of the multiplied redundant timing signals 122 or 124 as ACTIVE and the other as ACTIVE, depending on the status of control signal 36.

Phase integrator 140 is coupled to switching and selecting circuitry 134, and receives the ACTIVE timing signal. Phase integrator 140 may include a third phase-locked loop 142 operable to receive the ACTIVE timing signal and to integrate phase transients out of the ACTIVE timing signal as necessary upon a switching event. An external crystal-controlled oscillator 144 may, but need not be coupled to a third phase-locked loop 142 to provide a smooth phase transient. Phase integrator 140 may operate to generate a phase-integrated timing signal 146 and a loss of lock signal 148. Loss of lock signal 148 operates to squelch the ACTIVE timing signal if a fault is detected in that signal.

A dividing circuitry 150 may receive phase-integrated timing signal 146 and loss of lock signal 148. Dividing circuitry 150 operates to generate an output timing reference 154 by dividing the frequency of the ACTIVE signal by the factor N. In this way the frequency of output timing reference 154 matches that of redundant timing signals 110 and 112. Dividing circuitry 150 may further operate to squelch output signal 154 upon receipt of loss of lock signal 148. Dividing circuitry 150 may be any circuitry capable of dividing the frequency of the ACTIVE timing signal by the factor N, such as a divide-by-N counter. A NAND gate 152 may be coupled between third phase-locked loop 142 and dividing circuitry 150.

System 100 may further include an alignment circuitry 160 operable to detect a phase difference between timing signals 110 and 112, to integrate that difference, and to generate a correction signal 162 based on the integrated differences. Alignment circuit 160 may include phase detector 164, which receives multiplied redundant timing signals 122 and 124. An integrator 166 may be coupled to phase detector 164. Integrator 166 integrates the phase differences between timing signals 110 and 112, and generates phase correction signal 162 for aligning CLOCK B 12 with CLOCK A 10. A switch 168 may be coupled between integrator 166 and second phase-locked loop 120. Switch 168 operates to enable and disable alignment circuit 160 as desired.

Although the present embodiment shows alignment circuit 160 aligning CLOCK B 12 with CLOCK A 10 by sending correction signal 162 to second phase-locked loop 120, it should be understood that correction signal 162 could alternatively be sent to first phase-locked loop 118 to align CLOCK A 10 with CLOCK B 12, thus achieving the desired result. Phase detector 164 may be any circuitry operable to measure a phase difference between two or more incoming signals. Integrator 166 may include any circuitry operable to integrate a series of input signals and to generate correction signal 162. Switch 168 may be any circuitry operable to open or close alignment circuit 160 as desired.

Alignment circuitry 160 provides an advantage of preventing output timing reference 154 from "walking" due to repeated swaps of input timing signals 110 and 112 resulting in a phase shift in one direction. Alignment circuitry 160 operates to ensure that there is never more than a 45 degree phase difference, allowing consecutive swaps of reference clocks to compensate one another, preventing output signal 154 from walking in one direction.

System 100 may further include a control circuitry 200 operable to receive a forced switch bit 202, a manual switch bit 204, an automatic switch bit 206, and a clock selecting bit 208. Control circuitry 200 further operates to generate control signal 136, based on the status of control bits 202–208. Control circuitry 200 may include an AND gate 210 which receives manual switch bit 204 and loss of lock signals 126 and 128; an AND gate 212, which receives forced manual switch bit 202; a NAND gate 216, which receives manual switch bit 204; a NAND gate 218, which receives clock selecting bit 208; and an AND gate 214 receives the outputs from AND gates 210 and 212. Switch 168 receives the output of AND gate 214.

Control circuitry 200 may also include an OR gate 220, which receives forced manual switch bit 202 and the output from AND gate 210. A NAND gate 222 receives loss of lock signal 128, automatic switch bit 206 and outputs from a flip-flop 230 and NAND gate 216. A NAND gate 224 receives loss of lock signal 126, automatic switch bit 206, and the output from flip-flop 230. Switches 226 and 228 receive the outputs from NAND gates 222 and 224, respectively. Switches 226 and 228 also receive the output from OR gate 220 as a control signal. In addition, switch 226 receives the output of NAND gate 218, and switch 228 receives clock selecting bit 208. Flip-flop 230 receives the outputs of switches 226 and 228.

In operation, system 100 may be configured to accommodate a variety of switching operations including, for example, manual switching, provided timing signals 110 and 112 are not erroneous; manual switching, regardless of the status of timing signals 110 and 112; and automatic switching upon detecting a fault in the ACTIVE timing signal. The switching operation supported depends on the status of control bits 202–208.

In a particular embodiment, system 100 may support switching the ACTIVE and INACTIVE signals in response to a clock switching command, provided neither signal is erroneous. This configuration may be achieved by setting forced manual switch bit 202 to "0" and manual switch bit 204 to "1." In this way, the "0" applied to NAND gate 212 generates a "1" at the input of AND gate 214. Additionally, the "1" at the output of AND gate 210 is applied to AND gate 214 causing switch 168 to close and enabling alignment circuitry 160. Alignment circuitry 160 shifts the phase of multiplied redundant timing signal 124 until it is aligned with the phase of multiplied redundant timing signal 122. This process is very fast and depends on the time constant of integrator 166.

The "1" at the output of AND gate 210 is also applied at the input of OR gate 220. If neither timing signal 110 nor 112 is erroneous, i.e. neither loss of lock signal 126 nor 128 has been received, AND gate 210 produces a "1" at its output causing switches 226 and 228 to select the signal at input B. The signal at input B depends on the status of clock selecting bit 208. Thus, changing the status of clock selecting bit 208 causes switch 134 to swap between multiplied redundant timing signals 110 and 112. This swap may generate a slight glitch in the phase of the ACTIVE timing signal, which will be absorbed by shifting circuitry 140. If either loss of lock signal 126 or 128 is given, AND gate 210 produces a "0" at its output, which causes switches 226 and 228 to select the signal at input A, rather than the signal at input B. Because manual switching is accomplished through manipulation of clock selecting bit 208 at input B, detection of loss of lock signal 126 or 128 inhibits manual selection of an erroneous timing signal.

In another embodiment, system 100 may support switching the ACTIVE and INACTIVE signals in response to a clock switching command, regardless of the status of timing signals 110 and 112. This operation may be achieved by setting forced manual switch bit 202 to "1." In this way, the "1" applied to OR gate 220 forces switches 226 and 228 to select the signal at input B, regardless of whether loss of lock signal 126 or 128 is detected. By forcing switches 226 and 228 to respond to the signal at input B, timing signals 110 and 112 may be swapped by changing the status of clock selecting bit 208.

Setting forced manual switch bit 202 to "1" also acts to disable alignment circuitry 160. Because alignment circuitry 160 is disabled, the swap of timing signals 110 and 112 may generate a narrow glitch in the phase of the ACTIVE timing signal. With appropriate design, shifting circuitry 140 may absorb the glitch without generating loss of lock signal 148. The glitch in the ACTIVE timing signal may be absorbed, for example, by including crystal-controlled oscillator 144 in phase integrator 140.

In still another embodiment, system 100 may automatically switch the ACTIVE and INACTIVE signals in response to detecting a fault in the ACTIVE timing signal. This mode of operation may be accomplished by setting manual switch bit 204 to "0" and automatic switch bit 206 to "1." In this way, NAND gates 222 and 224 are enabled to react to loss of lock signals 126 and 128, respectively. In this mode of operation, a swap in timing signals 110 and 112 will only occur on receipt of a loss of lock signal associated with the ACTIVE timing signal. Setting manual switch bit 204 to "0" disables alignment circuitry 160. With alignment circuitry 160 disabled, some wander in the phase of the ACTIVE clock can be expected. This condition is acceptable, however, given that the alternative is to experience a failure condition. Furthermore, the wander in the phase of output timing reference 154 is small compared to typical wander tolerances of previous approaches to automatic switching. Therefore, any wander in output signal 154 is very unlikely to create errors.

In yet another embodiment of the present invention, system 100 may operate in a locked mode, preventing the ACTIVE clock from being changed, even upon detection of a loss of lock in the ACTIVE clock. This mode of operation may be accomplished by setting forced manual switch bit 202 and automatic switch bit 206 to "0." Setting automatic switch bit 206 to "0" operates to lock flip-flop 230 in the position set by the previous switching command. If the ACTIVE clock fails, system 100 does not swap timing signals 110 and 112. Loss of lock signal 148 will, however, squelch output timing reference 154.

Although the present invention and its advantages have been described in detail, it should be understood that various changes, substitutions and alterations can be made therein without departing from the spirit and scope of the invention as defined by the appended claims.

What is claimed is:

1. A circuitry for aligning first and second redundant timing signals and switching therebetween, comprising:

a first phase-locked loop operable to receive the first redundant timing signal as input and to generate a multiplied first redundant timing signal;

a second phase-locked loop operable to receive the second redundant timing signal as input and to generate a multiplied second redundant timing signal;

a selecting and switching circuitry coupled to the first and second phase-locked loops, the selecting and switching circuitry operable to receive the multiplied first and second redundant timing signals and to designate one of the multiplied redundant timing signals as ACTIVE and the other as INACTIVE; and a phase integrator coupled to the selecting and switching circuitry, the phase integrator operable to receive the ACTIVE timing signal and to integrate phase transients out of the ACTIVE timing signal when the ACTIVE and INACTIVE timing signal designations are switched.

2. The circuitry, as set forth in claim 1, further comprising a clock switching command, the selecting and switching circuitry switches the ACTIVE and INACTIVE timing signal designations in response thereto.

3. The circuitry, as set forth in claim 1, wherein the selecting and switching circuitry switches the ACTIVE and INACTIVE timing signal designations in response to detecting a fault in the ACTIVE timing signal.

4. The circuitry, as set forth in claim 1, wherein the first and second phase-locked loops are operable to monitor the first and second redundant timing signals, respectively, the first and second phase-locked loops each being operable to generate a loss of lock signal;

the selecting and switching circuitry operable to switch the ACTIVE and INACTIVE timing signal designations in response to detecting the loss of lock signal.

5. The circuitry, as set forth in claim 1, wherein the phase integrator comprises a third phase-locked loop.

6. The circuitry, as set forth in claim 1, wherein the phase integrator comprises a third phase-locked loop and a crystal-controlled oscillator coupled to the third phase-locked loop.

7. The circuitry, as set forth in claim 1, further comprising a dividing circuitry coupled to the phase integrator, the dividing circuitry operable to modify the frequency of the ACTIVE timing signal to attain an appropriate output frequency.

8. The circuitry, as set forth in claim 1, further comprising an alignment circuitry, the alignment circuitry operable to receive multiplied first and second redundant timing signals and to generate a correction signal, the correction signal being communicated to the second phase-locked loop.

9. The circuitry, as set forth in claim 8, wherein the alignment circuitry comprises:

a phase detector operable to receive multiplied first and second redundant timing signals; and an integrator coupled in series between the phase detector and the second phase-locked loop.

10. The circuitry, as set forth in claim 1, further comprising an alignment circuitry, the alignment circuitry operable to receive multiplied first and second redundant timing signals and to generate a correction signal, the correction signal being communicated to the first phase-locked loop.

11. The circuitry, as set forth in claim 10, wherein the alignment circuitry comprises:

a phase detector operable to receive multiplied first and second redundant timing signals; and an integrator coupled in series between the phase detector and the first phase-locked loop.

12. A method for aligning and switching between first and second redundant timing signals, comprising the steps of:

generating multiplied first and second redundant timing signals by multiplying the frequencies of the first and second redundant timing signals by an integer, N;

selecting one of the multiplied first and second timing signals as and ACTIVE timing signal and the other as an INACTIVE timing signal;

integrating phase transients out of the ACTIVE timing signal to avoid jitter;

dividing the frequency of the ACTIVE timing signal by the integer, N; and providing the divided ACTIVE timing signal as an output timing reference.

13. The method of claim 12, wherein the step of selecting the ACTIVE and INACTIVE timing signals comprises the step of switching the ACTIVE and INACTIVE timing signal designations in response to a clock switching command.

14. The method of claim 12, wherein the step of selecting the ACTIVE and INACTIVE timing signals comprises the step of switching the ACTIVE and INACTIVE timing signal designations in response to detecting a fault in the ACTIVE timing signal.

15. The method of claim 12, wherein the step of selecting the ACTIVE and INACTIVE timing signals comprises the steps of:

monitoring the first and second redundant timing signals for a loss of lock signal; and switching the ACTIVE and INACTIVE timing signal designations in response to the loss of lock signal.

16. The method of claim 12 further comprising the steps of:

detecting a phase difference between multiplied first and second redundant timing signals;

generating a correction signal based on the phase difference; and utilizing the correction signal to phase align multiplied first and second redundant timing signals.

17. In a telecommunications system having multiple timing subsystems receiving and distributing redundant timing signals, there is provided a circuitry for aligning first and second redundant timing signals and switching therebetween, comprising:

a first phase-locked loop operable to receive the first redundant timing signal as input and to generate a multiplied first redundant timing signal, the first phase-locked loop also operable to generate a first loss of lock signal;

a second phase-locked loop operable to receive the second redundant timing signal as input and to generate a multiplied second redundant timing signal, the second phase-locked loop also operable to generate a second loss of lock signal;

a selecting and switching circuitry coupled to the first and second phase-locked loops, the selecting and switching circuitry operable to receive the multiplied first and second redundant timing signals and the loss of lock signals, and to designate one of the multiplied redundant timing signals as ACTIVE and the other as INACTIVE;

a phase integrator coupled to the selecting and switching circuitry, the phase integrator operable to receive the ACTIVE timing signal and to integrate phase transients out of the ACTIVE timing signal when the ACTIVE and INACTIVE timing signal designations are switched; and a dividing circuitry coupled to the phase integrator, the dividing circuitry operable to modify the ACTIVE timing signal to attain an appropriate output frequency.

18. The circuitry, as set forth in claim 17, wherein the phase integrator comprises a third phase-locked loop and a crystal-controlled oscillator coupled to the third phase-locked loop.

19. The circuitry, as set forth in claim 17, further comprising an alignment circuitry operable to receive multiplied first and second redundant timing signals and to generate a correction signal, the alignment circuitry further operable to communicate the correction signal to the second phase-locked loop.

20. The circuitry, as set forth in claim 17, further comprising an alignment circuitry operable to receive multiplied first and second redundant timing signals and to generate a correction signal, the alignment circuitry further operable to communicate the correction signal to the first phase-locked loop.

\* \* \* \* \*